(12) United States Patent
Howe et al.

(10) Patent No.: US 11,964,441 B2
(45) Date of Patent: Apr. 23, 2024

(54) COMPOSITE PART WITH ADDITIVELY MANUFACTURED SUB-STRUCTURE

(71) Applicant: The Boeing Company, Chicago, IL (US)

(72) Inventors: Christopher A. Howe, Albert Park (AU); Paul David Evans, Essendon (AU); Stuart Bateman, Mount Waverley (AU); Martin Leary, Altona (AU)

(73) Assignee: The Boeing Company, Arlington, VA (US)

( * ) Notice: Subject to any disclaimer, the term of this patent is extended or adjusted under 35 U.S.C. 154(b) by 29 days.

(21) Appl. No.: 17/647,898

(22) Filed: Jan. 13, 2022

(65) Prior Publication Data

US 2022/0242061 A1 Aug. 4, 2022

Related U.S. Application Data

(60) Provisional application No. 63/144,425, filed on Feb. 1, 2021.

(51) Int. Cl.
| | | |
|---|---|---|
| B32B 7/00 | (2019.01) | |
| B29C 69/02 | (2006.01) | |
| B29C 70/44 | (2006.01) | |
| B29C 70/70 | (2006.01) | |
| B33Y 80/00 | (2015.01) | |
| B29K 71/00 | (2006.01) | |
| B29K 77/00 | (2006.01) | |
| B29K 79/00 | (2006.01) | |
| B29L 31/00 | (2006.01) | |
| B29L 31/30 | (2006.01) | |

(52) U.S. Cl.
CPC ............ *B29C 69/02* (2013.01); *B29C 70/443* (2013.01); *B29C 70/70* (2013.01); *B33Y 80/00* (2014.12); *B29K 2071/00* (2013.01); *B29K 2077/00* (2013.01); *B29K 2079/08* (2013.01); *B29L 2031/003* (2013.01); *B29L 2031/3076* (2013.01); *Y10T 428/24174* (2015.01)

(58) Field of Classification Search
None
See application file for complete search history.

(56) References Cited

U.S. PATENT DOCUMENTS

| | | |
|---|---|---|
| 9,370,921 B2 | 6/2016 | Butler et al. |
| 9,592,651 B2 | 3/2017 | Deobald et al. |

(Continued)

*Primary Examiner* — Alexander S Thomas
(74) *Attorney, Agent, or Firm* — Alleman Hall & Tuttle LLP

(57) ABSTRACT

Examples are disclosed herein that relate to vehicles, composite parts, and methods for forming a composite part for a vehicle. In one example, a vehicle comprises a composite part comprising a skin comprising one or more material layers. The composite part further comprises a stiffener comprising one or more material layers, wherein the stiffener comprises a flange and a web. The composite part also includes an additively manufactured sub-structure positioned between at least a portion of the skin and at least a portion of the stiffener. The additively manufactured sub-structure comprises at least one flange portion, at least one radius, and at least one radius filler. A polymer matrix is co-infused within the skin, the stiffener, and the additively manufactured sub-structure.

20 Claims, 12 Drawing Sheets

(56) References Cited

U.S. PATENT DOCUMENTS

| | | |
|---|---|---|
| 10,562,262 B2 | 2/2020 | Howe et al. |
| 10,583,605 B2 | 3/2020 | Howe et al. |
| 2014/0099477 A1* | 4/2014 | Matsen ................ B29C 70/543 |
| | | 156/60 |
| 2019/0193371 A1* | 6/2019 | Shinozaki ................ B32B 5/10 |
| 2019/0300141 A1 | 10/2019 | Song et al. |
| 2019/0322347 A1 | 10/2019 | Howe et al. |

* cited by examiner

500

```
┌─────────────────────────────────────────────────────────────────┐
│ FORM AN ADDITIVELY MANUFACTURED SUB-STRUCTURE COMPRISING AT LEAST│
│  ONE FLANGE PORTION, AT LEAST ONE RADIUS, AND AT LEAST ONE RADIUS│
│                          FILLER 502                              │
│  ┌───────────────────────────────────────────────────────────┐  │
│  │ FORM THE AT LEAST ONE FLANGE PORTION WITH A PORE SPACE OF │  │
│  │              ABOUT 0.1% TO ABOUT 99% 504                  │  │
│  └───────────────────────────────────────────────────────────┘  │
│                                                                  │
│  ┌───────────────────────────────────────────────────────────┐  │
│  │ FORM FROM A THERMOPLASTIC MATERIAL AND OPTIONAL ADDITIVES,│  │
│  │  FILLERS, OR A COMBINATION OF ADDITIVES AND FILLERS 506   │  │
│  └───────────────────────────────────────────────────────────┘  │
│                                                                  │
│  ┌───────────────────────────────────────────────────────────┐  │
│  │ FORM FLANGE PORTION TO COMPRISE A THICKNESS IN A RANGE OF │  │
│  │              0.001 INCHES TO 0.1 INCHES 508               │  │
│  └───────────────────────────────────────────────────────────┘  │
│                                                                  │
│  ┌───────────────────────────────────────────────────────────┐  │
│  │ FORM AT LEAST ONE WEB PORTION, WHEREIN THE RADIUS IS      │  │
│  │    BETWEEN A FLANGE PORTION AND A WEB PORTION 510         │  │
│  │  ┌─────────────────────────────────────────────────────┐  │  │
│  │  │ WEB PORTION COMPRISES A THICKNESS IN A RANGE OF     │  │  │
│  │  │            0.001 TO 0.1 INCHES 511                  │  │  │
│  │  └─────────────────────────────────────────────────────┘  │  │
│  │  ┌─────────────────────────────────────────────────────┐  │  │
│  │  │ WEB PORTION COMPRISES A HEIGHT IN A RANGE OF 0.01   │  │  │
│  │  │                TO 15 INCHES 512                     │  │  │
│  │  └─────────────────────────────────────────────────────┘  │  │
│  └───────────────────────────────────────────────────────────┘  │
│                                                                  │
│  ┌───────────────────────────────────────────────────────────┐  │
│  │ RADIUS COMPRISES A LENGTH IN A RANGE OF 0.01 TO 5 INCHES  │  │
│  │                         513                                │  │
│  └───────────────────────────────────────────────────────────┘  │
│                                                                  │
│  ┌───────────────────────────────────────────────────────────┐  │
│  │ RADIUS FILLER COMPRISES A HEIGHT IN A RANGE OF 0.01 TO 2  │  │
│  │                      INCHES 514                            │  │
│  └───────────────────────────────────────────────────────────┘  │
│                                                                  │
│  ┌───────────────────────────────────────────────────────────┐  │
│  │ FLANGE PORTION COMPRISES A LENGTH IN A RANGE OF 0.01      │  │
│  │              INCHES TO 5 INCHES 516                        │  │
│  └───────────────────────────────────────────────────────────┘  │
│                                                                  │
│  ┌───────────────────────────────────────────────────────────┐  │
│  │ CONNECTING A JOINT STRUCTURE OF THE ADDITIVELY            │  │
│  │ MANUFACTURED SUB-STRUCTURE TO A COMPLEMENTARY JOINT       │  │
│  │ STRUCTURE OF A SECOND ADDITIVELY MANUFACTURED             │  │
│  │                SUB-STRUCTURE 518                           │  │
│  └───────────────────────────────────────────────────────────┘  │
└─────────────────────────────────────────────────────────────────┘
                                │
                                ▼
                              ┌───┐
                              │ B │
                              └───┘
```

COMPOSITE PART WITH ADDITIVELY MANUFACTURED SUB-STRUCTURE

CROSS REFERENCE TO RELATED APPLICATIONS

This application claims priority to U.S. Provisional Patent Application Ser. No. 63/144,425, filed Feb. 1, 2021, the entirety of which is hereby incorporated herein by reference for all purposes.

BACKGROUND

Vehicles include many different structural components that are under force during use. For example, skin panels of an aircraft form a surface that is acted upon by aerodynamic forces during flight. As such, the aircraft includes structures configured to reinforce the skin panels and impart aerodynamic forces acting upon the skin panels to load-bearing support structures. For example, structures referred to as "stringers" and "longerons" are used to stiffen skin panels and transmit aerodynamic forces acting upon the skin panels to load-bearing structures such as spars and/or ribs. These stiffeners may take various forms. As examples, some stiffeners may have a blade-shaped cross section with a flange and a web, while others may have a hollow interior and a cross-sectional shape akin to a top hat. Stiffeners may include a radius, for example, where a web and flange meet.

In some vehicles, structural components can be made from composite materials, such as a carbon fiber/epoxy system. In such vehicles, skin and stiffeners may be formed as a unitary structure by curing skin and stiffeners together. However, forming such unitary composite parts can pose various challenges. For example, in a resin infusion process, layers of a fibrous material (e.g., a dry fiber cloth) are arranged in a mold into a shape of a preform, and then a vacuum process is used to infuse the preform with a resin. In embodiments, the resin may be a flowable resin having a viscosity that is suitably low to infuse the layers of the fibrous material within a desirable processing time, and that comprises a polymerizable material that can be cured to form a solid. Such resins also can be referred to as liquid resins. The mold materials for potentially complex composite structures such as components of an aircraft, in many cases, are composed of silicone, or other similar polymeric or rubber based-materials, that are expensive and have low life cycles.

For potentially complex composite structures, where out of plane loads are applied, in particular at composite joints, interlaminar strength is typically achieved using film adhesives, resin impregnated forms and/or organic filler materials. However, in some instances these features, when positioned in a dry fiber preform (e.g., a fiber-containing preform not pre-impregnated with resin), can impede resin flow during infusion, in particular where solid films, noodles or protective layers are included in the composite structure.

SUMMARY

To address the above issues, according to one aspect of the present disclosure, a vehicle comprises a composite part comprising a skin comprising one or more material layers. The composite part further comprises a stiffener comprising one or more material layers, wherein the stiffener comprises a flange and a web. The composite part also includes an additively manufactured sub-structure positioned between at least a portion of the skin and at least a portion of the stiffener. The additively manufactured sub-structure comprises at least one flange portion, at least one radius, and at least one radius filler. Further, a polymer matrix is co-infused within the skin, the stiffener, and the additively manufactured sub-structure.

According to another aspect of the present disclosure, a composite part for a vehicle comprises a skin comprising one or more material layers. The composite part further comprises a stiffener comprising one or more material layers, the stiffener comprising a flange and a web. The composite part also includes an additively manufactured sub-structure positioned between at least a portion of the skin and at least a portion of the stiffener. The additively manufactured sub-structure comprises at least one flange portion, at least one radius, and at least one radius filler. Further, a polymer matrix is co-infused within the skin, the stiffener, and the additively manufactured sub-structure.

According to another aspect of the present disclosure, a method for forming a composite part for a vehicle comprises forming an additively manufactured sub-structure comprising at least one flange portion, at least one radius, and at least one radius filler. A preform is formed comprising one or more material layers of a skin, the additively manufactured sub-structure, and one or more material layers of a stiffener, the stiffener comprising a flange and a web. The preform is infused with a liquid resin, and the liquid resin is cured to form the composite part.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIGS. 5A and 5B illustrate a flow diagram depicting an example method for forming a composite part for a vehicle according to the present disclosure.

DETAILED DESCRIPTION

Figure 1:
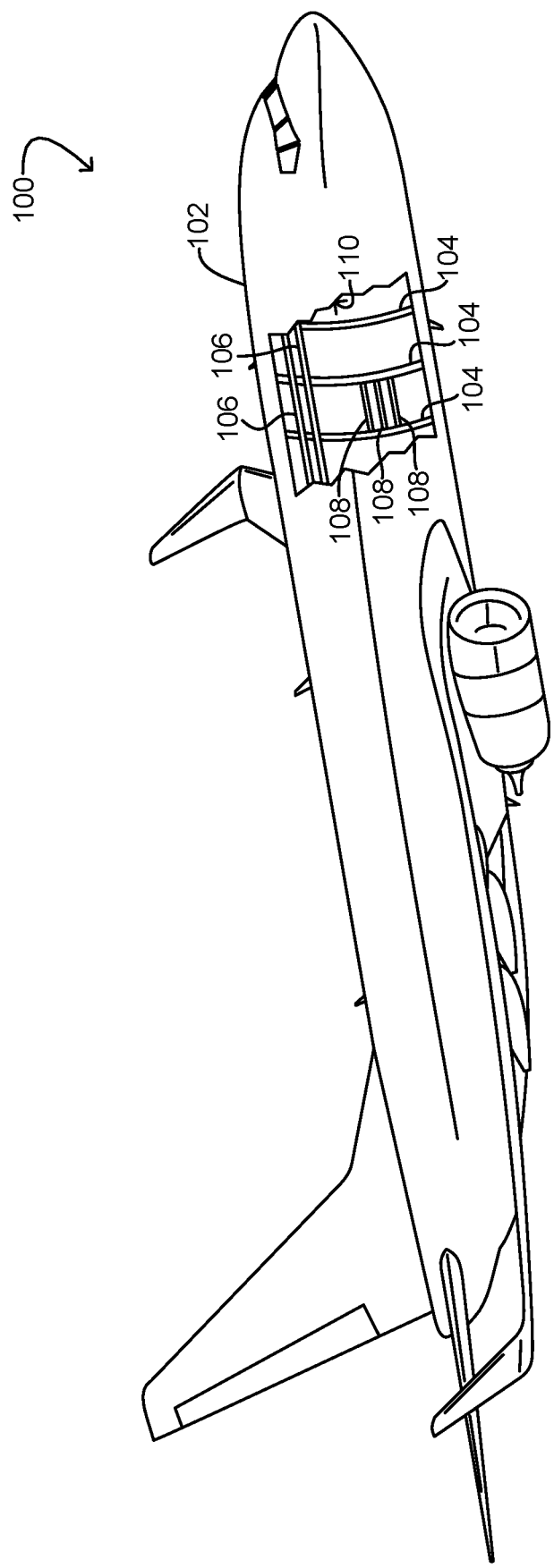
FIG. 1 shows one example of a vehicle according to examples of the present disclosure.

As introduced above, various components of a vehicle can be made from composite materials. FIG. 1 shows one example of a vehicle in the form of an aircraft 100 comprising composite parts. In other examples, the vehicle can take the form of a ground-based vehicle (e.g. a car or truck), a drone, a surface watercraft, a submarine, or any other suitable vehicle.

The aircraft 100 includes a fuselage 102. The fuselage 102 comprises a framework of load-bearing components, including a plurality of frames components 104, and stiffeners in the form of longerons 106 and stringers 108. The longerons 106 and the stringers 108 stiffen a skin 110 of the aircraft and transfer loads from the skin 110 to the frame components 104 to distribute loads throughout the aircraft 100.

In some examples, the skin 110, the longerons 106, the stringers 108, and/or any other suitable components of the aircraft 100 can be formed from composite materials. For example, and as introduced above, the skin 110 and one or more stiffeners (e.g. longerons 106 and/or stringers 108) can be formed as a unitary composite structure by constructing a preform that includes the skin and the one or more stiffeners, infusing the preform with liquid resin, and curing the parts together.

However, forming such a potentially complex composite part can pose various challenges. For example, as mentioned above, materials used for molding potentially complex composite structures in many cases are composed of silicone or other similar polymeric or rubber-based materials. These materials can be expensive and have low life cycles. Further, infusing a preform for such a composite part with a resin can be difficult, as various sub-structures (components that make up the preform and that are incorporated into the composite part) can impede resin flow. In some embodiments, the sub-structures include a preform aid, a preform mandrel, a resin flow aid, a structural filler, a structural adhesive, and/or a surface barrier.

Accordingly, examples are disclosed that relate to the additive manufacturing of sub-structures for use in composite parts for vehicles. As described in more detail below, additive manufacturing allows for the convenient fabrication of potentially complex sub-structures that can provide support to a preform during a resin infusion process. Further, an additively manufactured sub-structure can be co-bonded to the other sub-structures in the composite part (e.g. a skin and a stiffener), thereby incorporating the additively manufactured sub-structure into the finished molded composite structure. The term "co-bonding" as used herein indicates a chemical bond, physiochemical bond, and/or mechanical linkage (e.g. interlocking) between an additively manufactured structure and a polymer matrix that is formed by curing a resin, such as a liquid resin, while the resin in contact with the additively manufactured structure.

The design of an additively manufactured sub-structure can be tailored to a particular composite part. For example, an additively manufactured sub-structure can be designed to accurately fill a space in a composite part, provide strength and stiffness along one or more desired dimensions, provide a desired coefficient of thermal expansion along one or more desired dimensions, provide a desired toughness in-plane and through thickness where laminates meet, provide a desired bond strength to the surrounding matrix, provide a desired permeability (e.g. for air and/or volatile removal), and/or provide permeability for resin flow through the composite. Such structures can be used on an inner mold line, an outer mold line, or internal to a composite laminate structure. An additively manufactured sub-structure can perform multiple functions, including acting as a preform aid, a preform mandrel, a resin flow aid, a structural filler, a structural adhesive, and/or a surface barrier.

Figure 2:
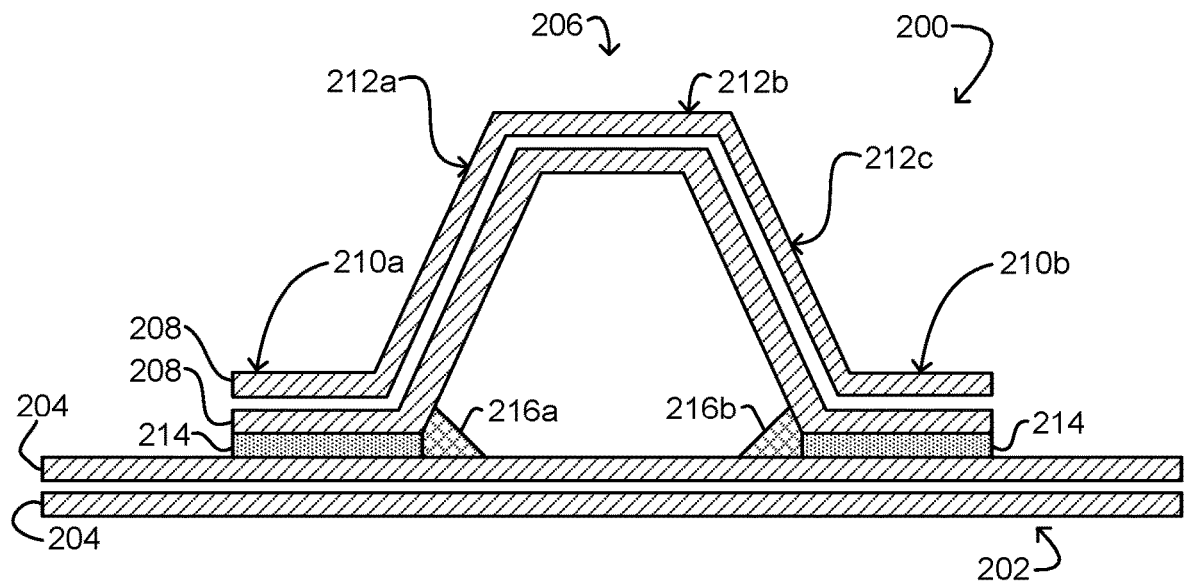
FIG. 2 shows a schematic cross-section of a composite part preform comprising a toughened adhesive.
Figure 3:
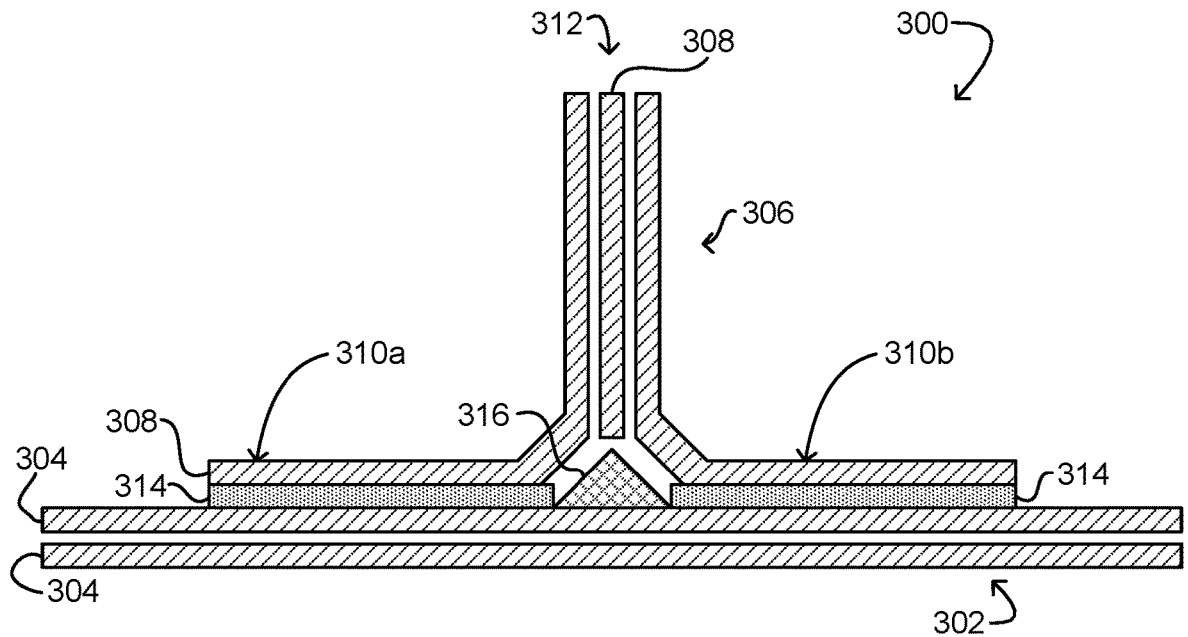
FIG. 3 shows a schematic cross-section of another composite part preform comprising a toughened adhesive.

As one example, an interface between a skin and a stiffener of a composite aircraft part can be subject to high pull-off loads during aircraft usage. As such, it is desirable for the joint between these structures to have a strong interlaminar fracture toughness. One alternative method of strengthening this joint is to use a toughened adhesive film or toughened interlayers at the interface of the skin and stiffener in the preform to provide a suitably robust interlaminar fracture toughness. FIG. 2 shows a composite part preform 200 including a skin portion 202 comprising a plurality of layers 204 of a fibrous material, and a stiffener portion 206 that also comprises a plurality of layers 208 of a fibrous material. In the example of FIG. 2, the stiffener portion 206 takes the form of a top hat stiffener comprising a first flange 210a, a second flange 210b, a first web portion 212a, a second web portion 212b, and a third web portion 212c. In other examples, a stiffener can take any other suitable form, including but not limited to a blade stiffener, an omega stiffener, a prism stiffener, a flat stiffener, a bulb flat stiffener, a J stiffener (e.g., a blade stiffener in combination with a flange), or an angle stiffener. FIG. 3 shows a schematic cross-section of a composite part preform 300 configured as a blade stiffener. The composite part preform 300 includes a skin portion 302 comprising a plurality of layers 304 of a fibrous material, and a stiffener portion 306 also comprising a plurality of layers 308 of a fibrous material. The stiffener 306 comprises a first flange 310a and a second flange 310b on opposing sides of a web 312.

Toughened adhesives film are shown at the interfaces between the skin and stiffener at 214 in FIG. 2 and 314 in FIG. 3. FIG. 2 also shows a first radius filler 216a positioned at a radiused joint between the skin 202, the first flange 210a, and the first web 212a, and a second radius filler 216b positioned at a joint between the skin 202, the second flange 210b, and the third web 212c. The radius fillers 216a, 216b fill voids adjacent to a radiused joint where the flange and web meet. Similarly, in FIG. 3, a radius filler 316 is positioned at a joint between the skin 302 and the stiffener. While shown schematically in FIGS. 2 and 3 as having angular configurations, each radiused joint can also have a smoothly curved shape.

Figure 4A:
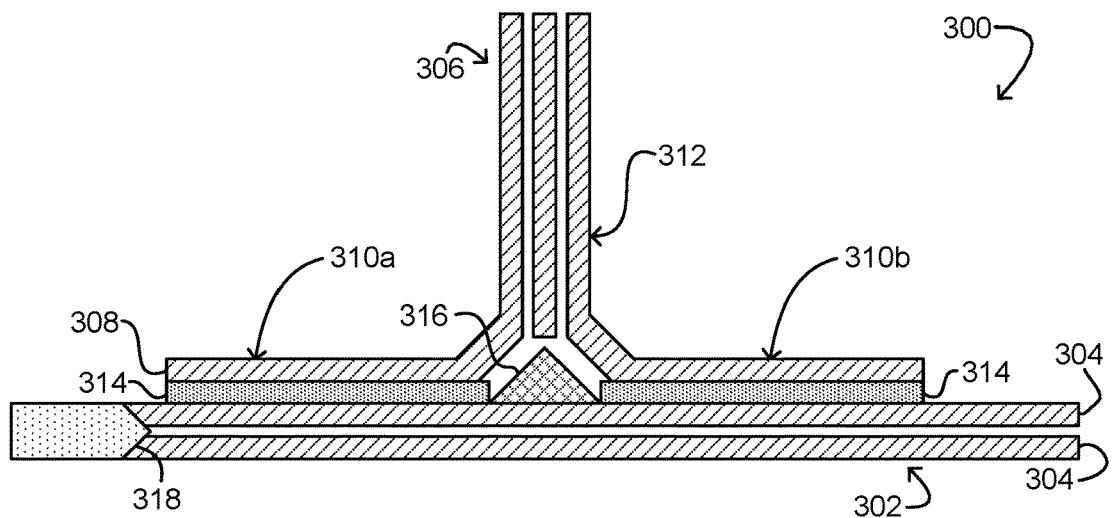
FIGS. 4A-4C show the composite part preform of FIG. 3 at successive stages of resin infusion.
Figure 4B:
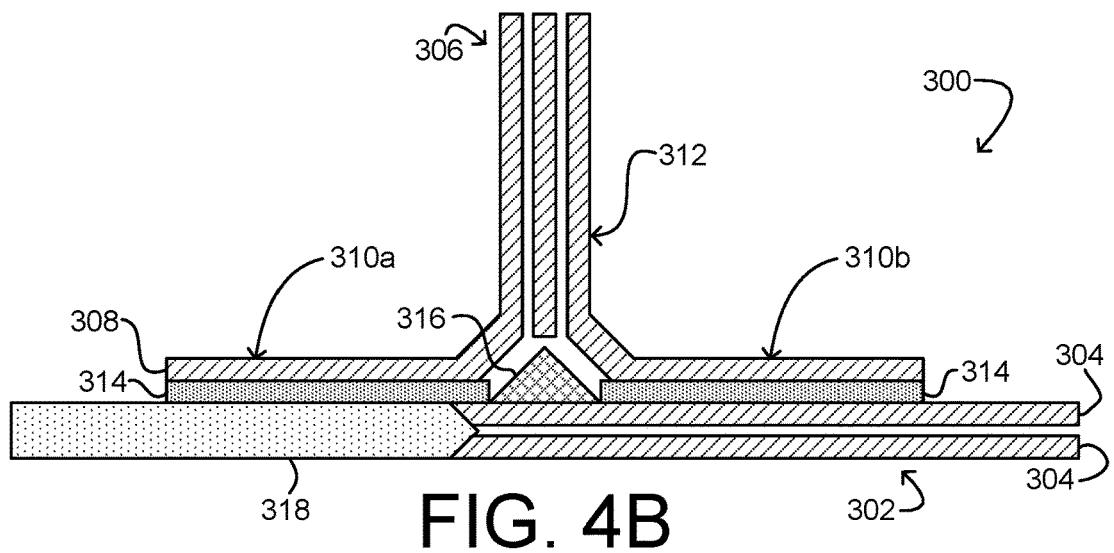
Figure 4C:
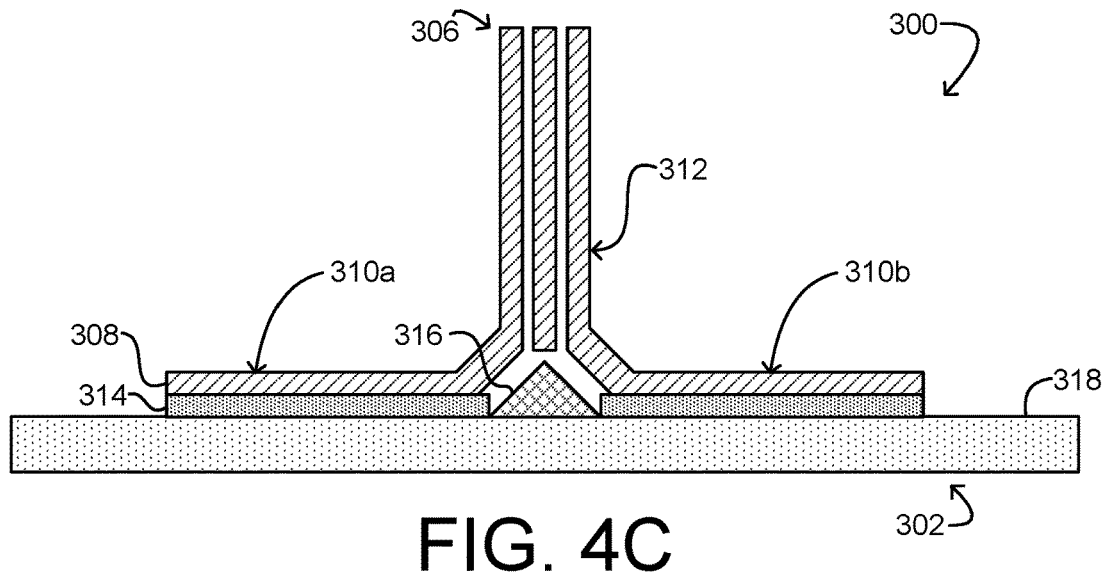

While the toughened adhesive films and the radius fillers help to strengthen the composite part, the toughened adhesive film and radius fillers can be costly and labor-intensive to apply. Also, the presence of the radius filler, toughened adhesive films, and/or other additional components besides the fibrous components can pose problems during resin infusion. For example, such sub-structures can be non-permeable and interrupt resin flow, thereby introducing voids into the composite structure. FIGS. 4A-4C show the preform 300 of FIG. 3 at successive stages of resin infusion. During resin infusion, a liquid resin 318 flows into and fills a preform assembly comprising the skin 302 and the stiffener 306. The liquid resin 318 flows through a plane formed by the material layers 304 of the skin 302. However, as the toughened adhesive film is non-porous, the toughened adhesive film 314 can block the liquid resin 318 from flowing from the skin 302 to the stiffener 306. As a result, undesirable voids may remain in the composite part after infusion.

As such, an additively manufactured sub-structure can be tailored to replace both the toughened adhesive film and the radius filler in this example. For example, the tailored additively manufactured sub-structure can include a porous flange portion that allows flow of adhesive between the skin and the flange of a stiffener during a liquid resin infusion process, thereby providing for a strong bond between these structures to resist pull-off loads. Further, the additively manufactured sub-structure can include a radius filler (which can be porous or non-porous), thereby allowing the omission of the use of a separate radius filler part in the manufacture a composite part comprising a skin and a stiffener and simplifying assembly of a preform for a composite part. While described herein in the context of a composite skin and stiffener, it will be understood that the disclosed examples may be applied to a wide variety of composite laminate parts for vehicles.

Figure 5B:
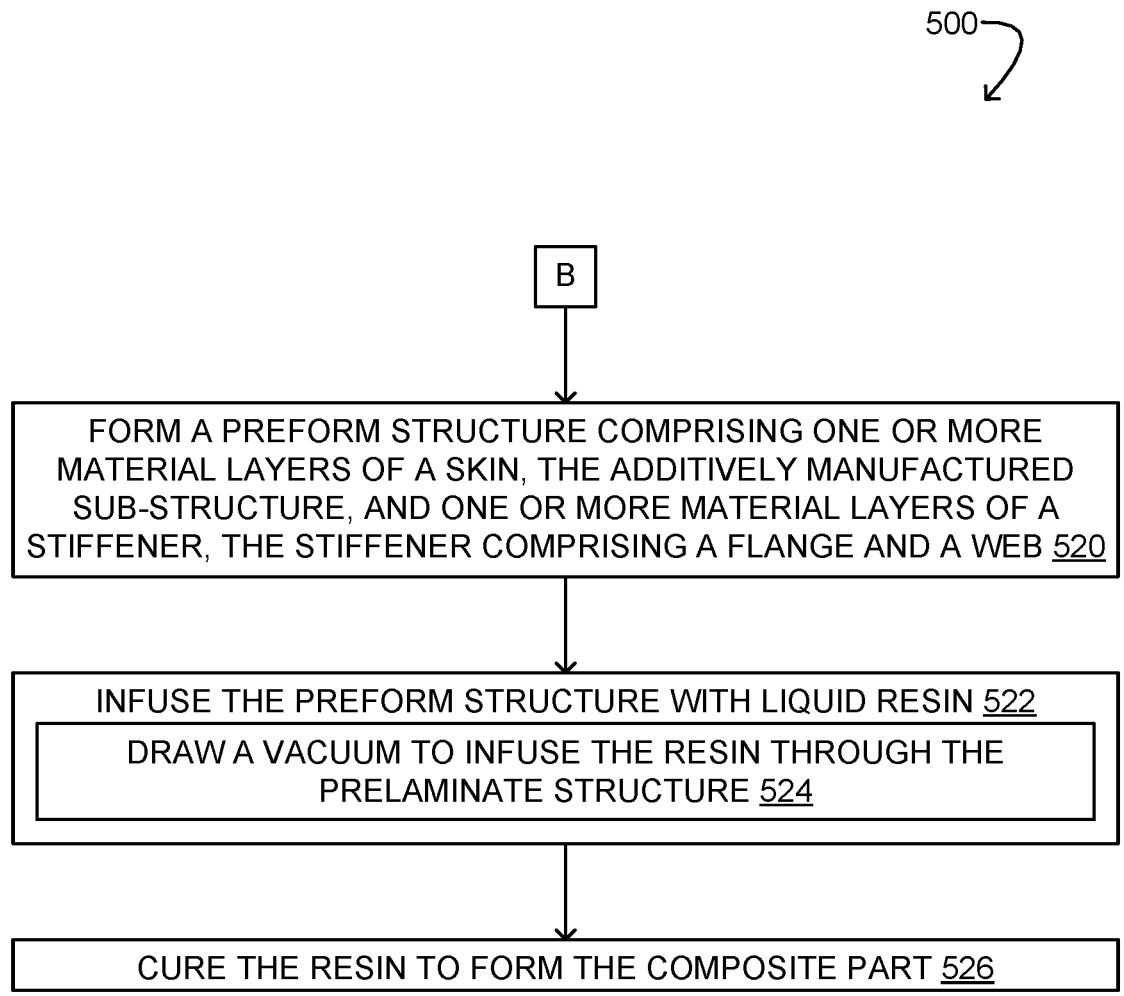

FIGS. 5A and 5B illustrate a flow diagram depicting an example method 500 for forming a composite part for a vehicle. It will be appreciated that the following description of method 500 is provided by way of example and is not meant to be limiting. It will be understood that various steps of method 500 can be omitted or performed in a different order than described, and that the method 500 can include additional and/or alternative steps relative to those illustrated in FIGS. 5A and 5B without departing from the scope of this disclosure.

At 502, the method 500 includes forming an additively manufactured sub-structure comprising at least one flange portion, at least one radius, and at least one radius filler. The additively manufactured sub-structure is configured to function like a mold or a forming tool in a later resin infusion process, providing structural support for other components of a preform (e.g., fibrous materials used to reinforce the skin and the stiffener) during lay-up, infusion, and curing. As described above, the characteristics of the additively manufactured sub-structure can be tailored to a wide variety of applications. Such characteristics can include a geometry (e.g. designed to match a space to be filled in a composite part), strength, stiffness, coefficient of thermal expansion, toughness in-plane and through thickness, bond strength to the surrounding matrix, permeability for air and/or volatile removal, and permeability for resin flow through the composite (which can contribute to co-bonding strength between the additively manufactured sub-structure and polymer matrix).

Figure 6:
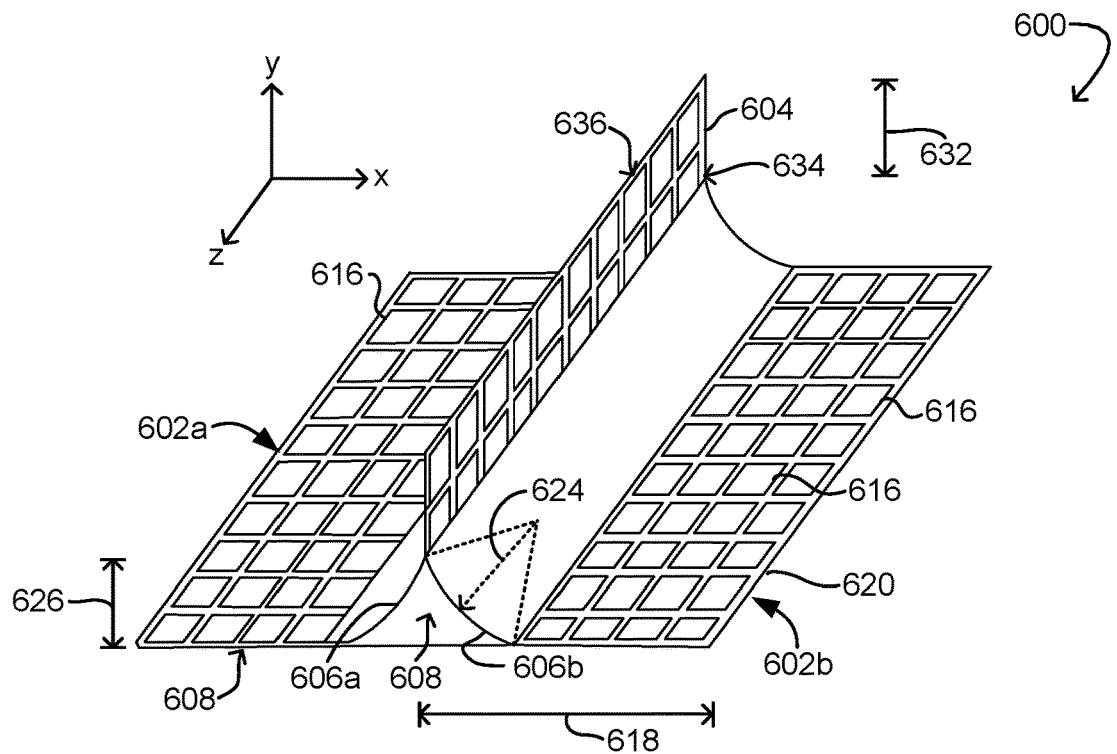
FIG. 6 shows one example of an additively manufactured sub-structure according to the present disclosure.

FIG. 6 shows one example of an additively manufactured sub-structure 600 configured to form a blade-type stiffener. The additively manufactured sub-structure 600 includes a first flange portion 602a and a second flange portion 602b on opposing sides of a web portion 604. The additively manufactured sub-structure 600 further includes a first radius 606a between the first flange portion 602a and the web portion 604, and a second radius 606b between the second flange portion 602b and the web portion 604. The first radius 606a and the second radius 606b define a space that is filled by a radius filler 608.

Figure 7:
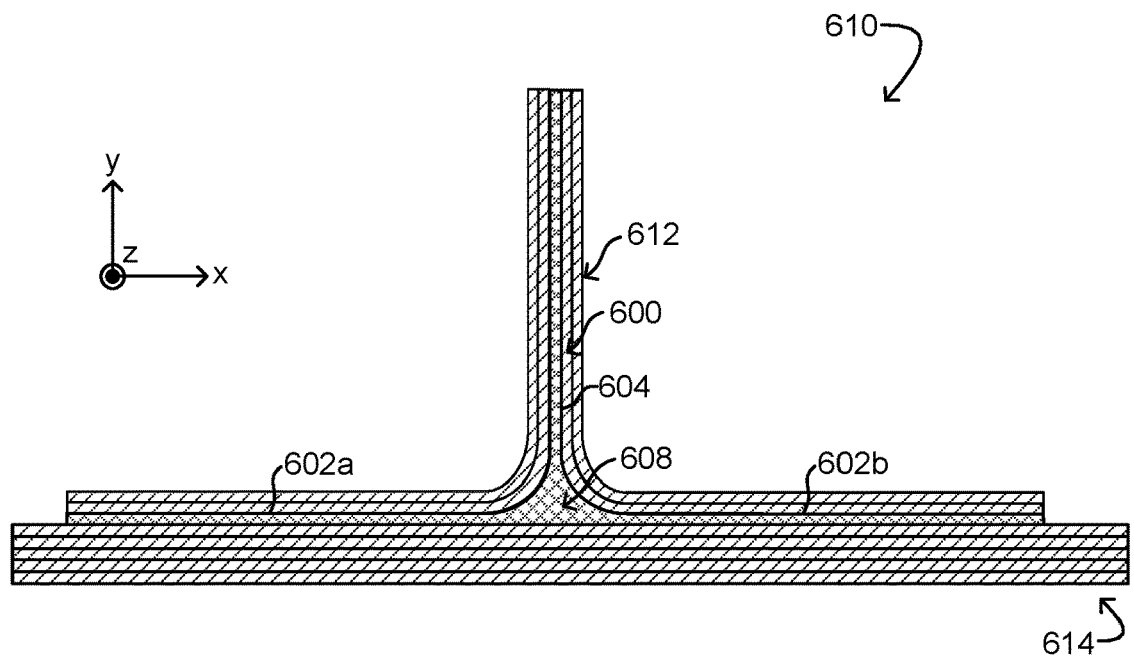
FIG. 7 shows a schematic cross-section of an example composite part that includes the additively manufactured sub-structure of FIG. 6.

FIG. 7 shows a schematic cross-section of one example of a composite part 610 that can include the additively manufactured sub-structure 600. The composite part 610 includes a skin 614 and a stiffener 612 that follows a contour of the additively manufactured sub-structure 600. The radius filler 608 fills a space bounded by the stiffener 612 and the skin 614.

As introduced above, at least a portion of the additively manufactured sub-structure can be formed to have a resin-permeable architecture. In this manner, and as described in more detail below with reference to FIGS. 12A-12C, the additively manufactured sub-structure permits resin flow through the preform during resin infusion, thereby avoiding formation of discrepancies, such as dry tows and voids in the resulting composite structure. This helps to form a strongly bonded composite part when co-infused (infusion of the additively manufactured sub-structure and fibrous material together) and cured as a unitary structure.

In the example of FIG. 6, the flange portions 602a and 602b and the web portion 604 are schematically depicted as being formed in a grid pattern comprising a plurality of pores 616 that permit resin to flow through and around the additively manufactured sub-structure 600. In other examples, a additively manufactured sub-structure, or any portion thereof, can comprise any other suitable configuration, and/or pores of any other suitable shape or pattern, or may omit such pores. In some examples, an additive manufacturing process may produce a sufficiently porous structure by ordinary operation of an additive manufacturing tool, for example, due to a resolution of the tool. In such an example, the pores can be provided by the ordinary operation of the tool, rather than by designing the pores as a part of the structure.

Suitable geometries and porosities also may be obtained via tool path optimization, in which pores are placed in a more deliberate and/or systematic manner. For example, the tool path can be engineered such that pores are at least partially offset between successively added layers of the additively manufactured sub-structure, thereby avoiding potential manufacturing defects.

As indicated at 504 of FIG. 5A, in some examples, one or more of the at least one flange portion and the at least one radius filler of the additively manufactured sub-structure can be formed with a pore space fraction of about 0.1% to about 99% (wherein the term "about" indicates any uncertainty due to a resolution of an additive manufacturing tool and/or other factors. In other examples, one or more portions of the additively manufactured sub-structure (e.g., a flange portion, a web portion, a radius, a radius filler) can have a different pore space fraction. In the example of FIG. 6, the radius filler 608 can be substantially solid (e.g., having a pore space fraction of substantially 0%), while the first flange portion 602a, the second flange portion 602b, and the web portion 604, are more porous (e.g., having a pore space fraction greater than substantially 0%). Further, in the other examples, the radius filler may have a porosity similar to that of the flange portion.

As a more specific example, the pore space fraction for a flange portion can be in a range of 0.4% to 20%. As another more specific example, the pore space fraction for a flange portion can be in a range of 1% to 5%. As another more specific example, the pore space fraction for a veil or grid structure may be in a range of 80-99%. As yet another more specific example, the pore space fraction for a veil or grid structure may be in a range of 90-97%. In this manner, the additively manufactured sub-structure can be configured with a suitable permeability to enable removal of moisture and volatile compounds via a vacuum drawn during the infusion process, as well as providing sufficient pore space fraction to enable resin to infuse the structure.

In some examples, one or more of the at least one flange portion and the at least one radius filler of the additively manufactured sub-structure have a through-thickness permeability of $10 \times 10^{-11}$ in$^2$ to $10 \times 10^{-6}$ in$^2$. In other examples, the through-thickness permeability is in a range of $10 \times 10^{-10}$ in to $10\times10^{-6}$ in$^2$. In yet other examples, the through-thickness permeability is in a range of $10\times10^{-9}$ in$^2$ to $10\times10^{-8}$ in$^2$.

Figure 8:
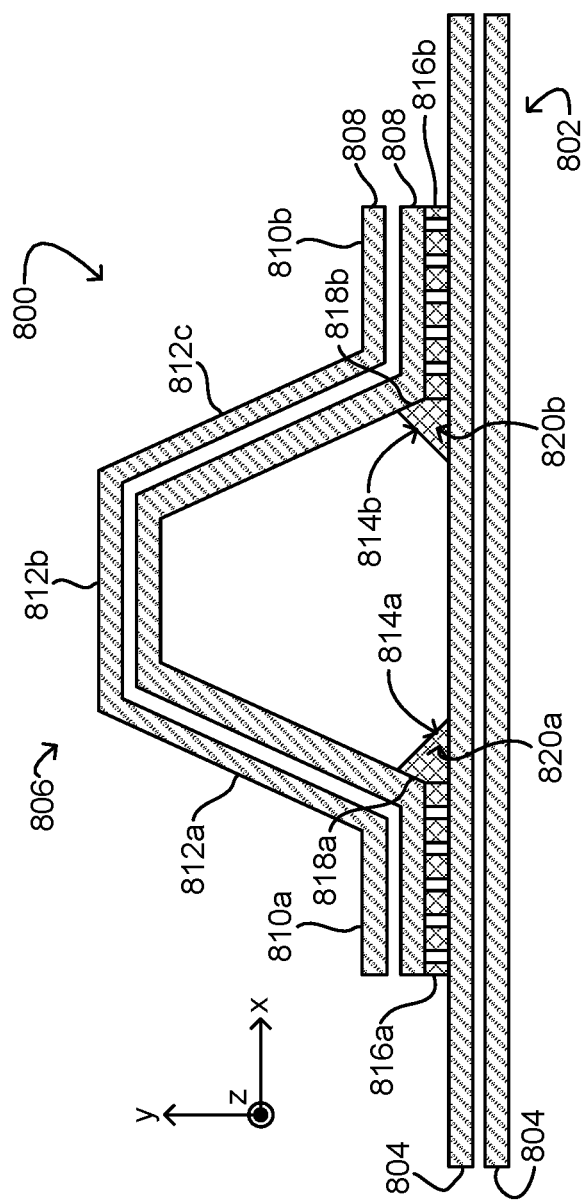
FIG. 8 shows a schematic cross-section of another example composite part according to the present disclosure.

FIG. 8 shows a schematic cross-section of another example of a composite part 800 for a vehicle. While omitted for clarity, it will be understood that a resin matrix is infused throughout the part. The composite part 800 includes a skin 802 comprising a plurality of material layers 804, and a stiffener 806 comprising a plurality of material layers 808. In the example of FIG. 8, the stiffener 806 takes the form of a top hat stiffener comprising a first flange 810a, a second flange 810b opposite the first flange 810a, a first web portion 812a, a second web portion 812b, and a third web portion 812c. The composite part 800 further comprises a first additively manufactured sub-structure 814a and a second additively manufactured sub-structure 814b, The first additively manufactured sub-structure 814a comprises a first flange portion 816a and a first radius 818a. The second additively manufactured sub-structure 814b comprises a second flange portion 816b and a second radius 818b. In the example of FIG. 8, the first additively manufactured sub-structure 814a and the second additively manufactured sub-structure 814b do not include web portions. While the radii 818a and 818b are shown as having an angular configuration in this example, each radius 818a, 818b also can have a smoothly curved configuration in other examples.

The radii 818a and 818b are configured to complement a contour of the stiffener 806. For example, the first radius 818a is complementary to a shape formed by the skin 802 and a contour of the first web 812a where the first web 812a meets the first flange 810a. Likewise, the second radius 818b is complementary to a shape of the skin 802 and a contour of the third web 812c where the third web 812c meets the second flange 810b.

A first radius filler 820a occupies a space bounded by the skin 802, the first flange portion 816a, and the first web 812a. Further, a second radius filler 820b occupies a space bounded by the skin 802, the second flange portion 816b, and the third web 812c. In this manner, the additively manufactured sub-structures 814a and 814b are configured to fit closely between the skin 802 and the stiffener 806. As described above, the first and second flange portions 816a, 816b are porous to accommodate resin flow during a resin infusion process to provide for co-bonding between the additively manufactured sub-structures 814a, 814b, the skin 802 and the stiffener 806. Further, in various examples, the radius fillers 820a and 820b can be porous or non-porous.

Returning to FIG. 5, an additively manufactured sub-structure as disclosed herein can be formed from any suitable material. In some examples, as indicated at 506 of FIG. 5A, an additively manufactured sub-structure can be formed from a thermoplastic polymer material. As more specific examples, an additively manufactured sub-structure can be formed from one or more materials selected from polyamides (e.g. nylon 12) polyimides (e.g. polyether imide), and polyaryletherketones, (e.g., polyetheretherketone (PEEK), polyetherketoneketone (PEKK), and polyetherketone (PEK)). In other examples, the material comprises a thermoset material. In yet other examples, the additively manufactured sub-structure can be formed from a copolymer or a blend, such as a nylon 6, 12 copolymer or blend. In some examples, the material can include one or more of inorganic fillers, organic fillers, fiberglass, nanomaterials (e.g., graphene), or carbon fiber. In one more specific example, an additively manufactured sub-structure can be formed from carbon-reinforced nylon 12. In some examples, different portions of an additively manufactured sub-structure (e.g., a flange portion, a web portion, a radius, a radius filler) can be formed from different materials, and/or with different porosities, strengths, stiffnesses, toughnesses, and/or other characteristics such as conductivity.

Figure 9:
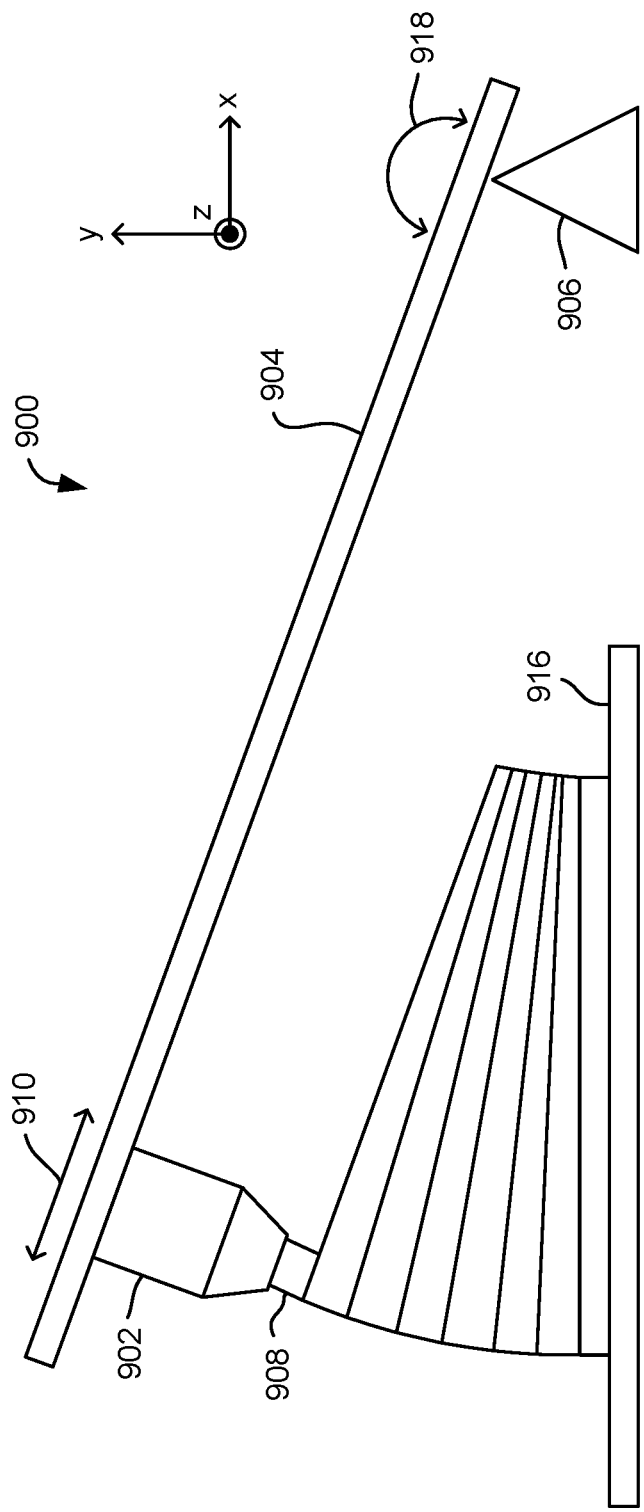
FIG. 9 schematically shows an example of an additive manufacturing apparatus.

Any suitable additive manufacturing process can be used to form an additively manufactured sub-structure according to the present disclosure. Examples include Material Extrusion (MEX) (also known as fused filament fabrication, fused deposition molding), Powder Bed Fusion (PBF) techniques such as selective laser sintering and Binder Jetting Techniques (ISO/ASTM 52900: 2017-06 (Additive Manufacturing—General Principles—Terminology (ISO/ASTM 52900: 2015)); ASTM F2792 (Standard Terminology for Additive Manufacturing Techniques)). FIG. 9 schematically shows one example of an apparatus 900 for manufacturing an additively manufactured sub-structure. In the apparatus 900, a deposition head 902 is movably mounted on a rotating arm 904. The rotating arm 904 is rotatably mounted to a fulcrum 906. Control of deposited material 908 is achieved by radial motion 910 of the deposition head 902 as well as translation (e.g. in the X-, Y-, and Z-axes) of a platform bed 916 on which the material 908 is deposited. Rotation 918 of the arm 904 about the fulcrum 906 changes a circular path of the deposited material 908. Additional degrees of freedom can be obtained by translation of the fulcrum 906 in the X-, Y-, and Z-axis directions. In this manner, and as described in more detail below, different deposition layers of the additively manufactured sub-structure can be arranged to increase resistance to thermally induced cracking. In other examples, any other suitable additive manufacturing apparatus can be used. The use of such a fulcrum-based material extrusion system may allow the formation of continuously curved structures, which may be difficult to form using other material extrusion system architectures.

An additively manufactured sub-structure according to the present disclosure may have dimensions within any suitable ranges. For example, where the additively manufactured sub-structure is for a stiffener, the at least one flange portion of the additively manufactured sub-structure can comprise a thickness in a range of 0.001 inches to 0.1 inches, as indicated at 508 of FIG. 5A. In the example of FIG. 6, the first flange portion 602a and the second flange portion 602b each have a thickness that is measured parallel to the Y-axis. In a more specific example, the additively manufactured sub-structure can have a thickness within a range of 0.001-0.020 inches. The use of a relatively thinner sub-structure can provide advantages such as lower weight and lower materials costs. The thickness may be a function of a material used, as various materials may provide for greater stiffness and/or strength than others of a same thickness. In some examples, post-processing methods, such as chemical etching and/or machining, may be used to achieve a desired thickness (or other dimensional characteristic) within a desired tolerance.

In some examples, as indicated at 510, the method 500 includes forming at least one web portion, and forming the at least one radius between the at least one flange portion and the at least one web portion. When the additively manufactured sub-structure includes a web portion, as indicated at 511, the web portion in some examples can comprise a thickness in a range of 0.001 inches to 0.1 inches. Further, in some examples, the web portion can have a thickness in a range of 0.001 to 0.020 inches, as described above with regard to the flange portion. Further, in some examples, the web portion can comprise a height in a range of 0.01 to 15 inches, as indicated at 512. In the example of FIG. 6, a height 632 of the web portion 604 is measured parallel to the Y-axis from the top edge 634 of the radius filler 608 to a top edge 636 of the web portion 604, and thickness is measured parallel to the X-axis.

Likewise, each radius can have any suitable dimensions. In some examples, as indicated at 513, the radius can comprise a radial length to a center of curvature in a range of 0.01 to 5 inches, depending upon a scale and size of a composite part. In the example of FIG. 6, the second radius 606b comprises a concave surface forming at least a portion of a circumference of a circle having a radius 624 in a range of 0.01 to 0.5-inches (e.g. for a smaller-scale aircraft, such as a small drone) to 0.125 to 5 inches (e.g. for a larger-scale aircraft, such as for a wing skin for a commercial aircraft). In this example, the first radius 606a has mirror symmetry with the second radius 606b about the YZ-axis, but may have any other suitable shapes in other examples. It will also be appreciated that the first radius 606a and the second radius 606b may be convex with respect to the radius filler 608 in some examples.

The radius filler of an additively manufactured sub-structure can have any suitable dimensions complementary to an associated radius. In some examples, as indicated at 514 of FIG. 5A, the radius filler comprises a height in a range of 0.01 to 2 inches. In the example of FIG. 6, the height of the radius filler is measured parallel to the Y-axis from a bottom surface of to a top edge 634 of the radius filler 608.

Likewise, the flange portion of an additively manufactured sub-structure can have any suitable dimensions. In some examples, the flange portion of the additively manufactured sub-structure comprises a length in a range of 0.01 inches to 5 inches, as indicated at 516 of FIG. 5A. In the example of FIG. 6, a length 618 of the second flange portion 602b is measured parallel to the x-axis from a center of the radius filler 608 to a distal edge 620 of the second flange portion 602b.

In some instances, it may be desired to form an additively manufactured sub-structure with a dimension that exceeds the working dimensions of a 3D printer (e.g. the dimensions of an enclosure of the printer). Thus, as indicated at 518, in some examples a first additively manufactured sub-structure can comprise a connector configured to connect to a complementary connector of a second additively manufactured sub-structure. In this manner, two or more additively manufactured sub-structures can be joined together to produce a larger component. In addition, the connectors can be used to orient the additively manufactured sub-structures with respect to one another.

Figure 10:
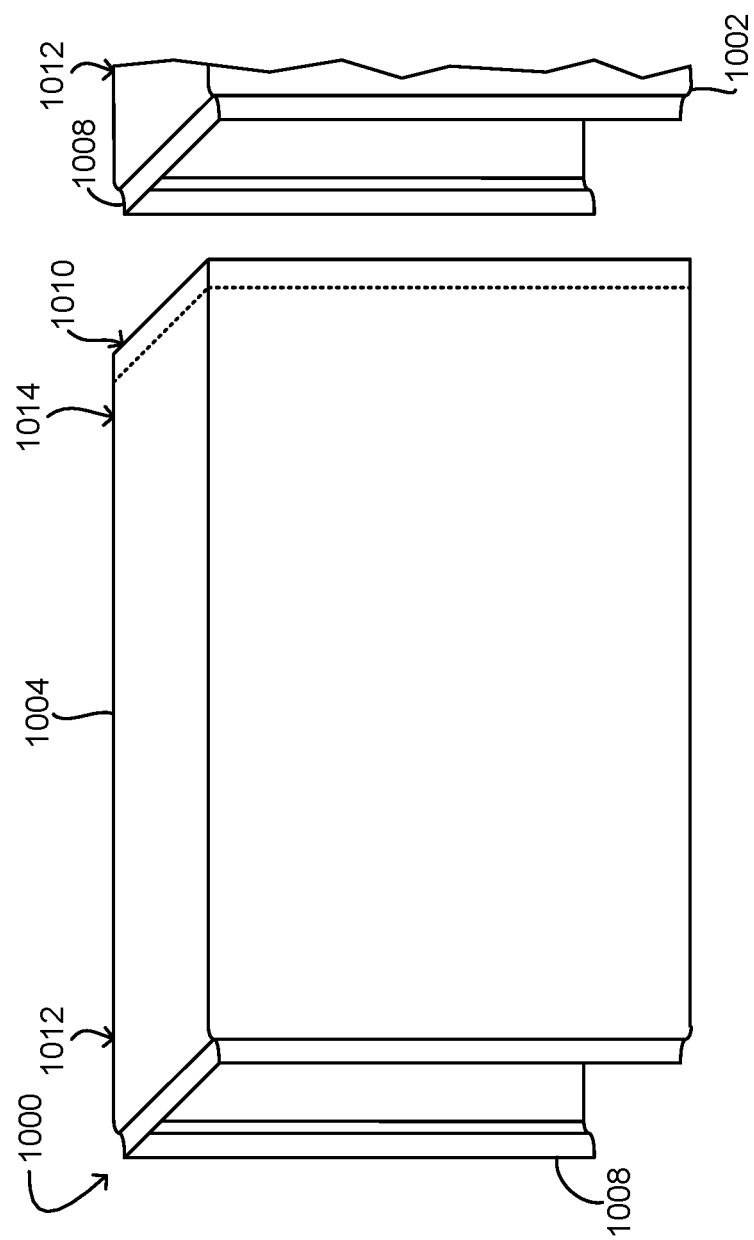
FIG. 10 shows an example of an assembly for use in a composite part, the assembly comprising a first additively manufactured sub-structure and a second additively manufactured sub-structure with complementary connectors.

FIG. 10 shows one example of an assembly 1000 including a first additively manufactured sub-structure 1002 and a second additively manufactured sub-structure 1004. Each of the additively manufactured sub-structures 1002 and 1004 includes a connector 1008 at a first end 1012, and a complementary connector 1010 at an opposite end 1014 configured to accommodate the connector 1008. The depicted connector 1008 comprises a joggle joint including an narrowed end portion on the first end 1012 of each additively manufactured sub-structure, and the complementary connector 1010 comprises a complementary space on the opposite end 1014 to receive the narrowed end portion.

In some examples, the additively manufactured sub-structure further undergoes one or more post-processing, treatment, and/or finishing steps after being additively formed. For example, the additively manufactured sub-structure can be finished to within a desired dimensional tolerance by machining, sanding, abrasion, or etching. In other examples, a material or a surface finish can be applied to the additively manufactured sub-structure to strengthen adhesion to the surrounding matrix of the composite. In some examples, the surface finish comprises one or more of surface roughness, ripple pitch, ripple height, and pattern. In this manner, the surface finish and/or pre-finishing construction of the additively manufactured sub-structure comprises a controllable architecture which can help to form a mechanical bond linking the additively manufactured sub-structure to the polymer matrix. In other examples, such surface textures can be formed during the additive manufacturing process.

Figure 11:
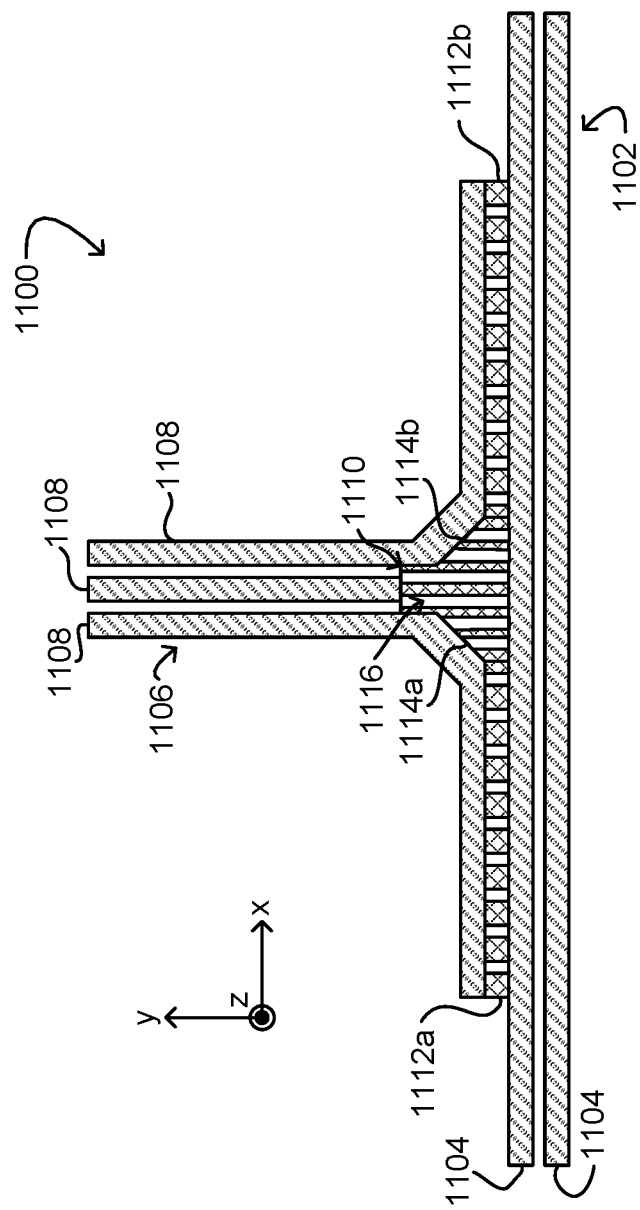
FIG. 11 shows a schematic cross section of an example preform comprising an additively manufactured sub-structure according to an example of the present disclosure.

With reference now to FIG. 5B, at 520, the method 500 includes forming a preform. The preform comprises one or more material layers of a dry fiber reinforcement material corresponding to a skin, the additively manufactured sub-structure, and one or more material layers of a dry fiber reinforcement material corresponding to a stiffener. FIG. 11 shows one example of a preform 1100. The preform 1100 comprises a skin 1102 comprising a plurality of material layers 1104. The preform 1100 further comprises a blade-type stiffener 1106 comprising a plurality of material layers 1108.

In some examples, the skin 1102 and the stiffener 1106 each comprise at least one carbon fiber layer. In other examples, the skin 1102 and the stiffener 1106 may comprise any other suitable fibrous material. Some examples of other suitable materials include, but are not limited to, dry fibers such as fiberglass, polyimide fibers, aramid fibers, basalt, and polypropylene fibers. In yet other examples, the material layers 1104 and 1108 may comprise two or more different fibrous materials. Further, the skin 1102 and the stiffener 1106 each may comprise a plurality of different types of fibrous materials in some examples. The layers 1108 of the stiffener 1106 can be formed into a desired shape using any suitable method(s), such as by placing the layers 1108 in a mold and applying heat or pressure.

In the example of FIG. 11, an additively manufactured sub-structure 1110 is inserted between the stiffener 1106 and the skin 1102. In some examples, the additively manufactured sub-structure 1110 is formed as a separate part and then assembled within the preform 1100. In other examples, the additively manufactured sub-structure 1110 is formed directly on the skin 1102.

Like the additively manufactured sub-structure 600 of FIG. 6, the additively manufactured sub-structure 1110 includes a first flange portion 1112a and a second flange portion 1112b. The additively manufactured sub-structure 1110 further comprises a first radius 1114a that extends from the first flange portion 1112a and follows a contour of the stiffener 1106. A second radius 1114b extends from the second flange portion 1112b and follows the contour of the stiffener 1106. The first radius 1114a and the second radius 1114b, together with the skin 1102, form a boundary of a space that is filled by a radius filler 1116.

Figure 12A:
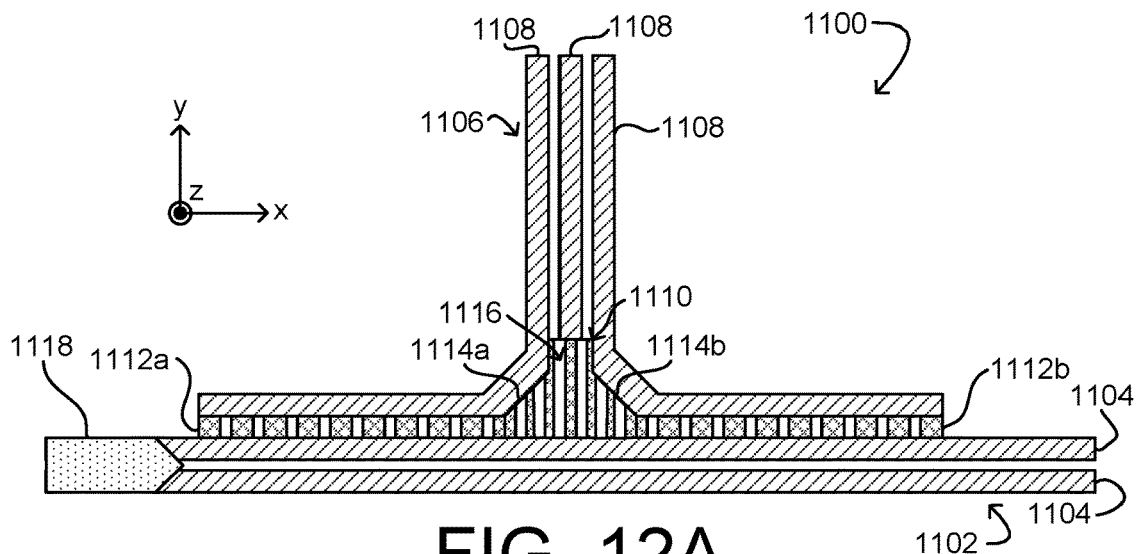
FIGS. 12A-12C show the preform of FIG. 11 at successive stages of resin infusion.
Figure 12B:
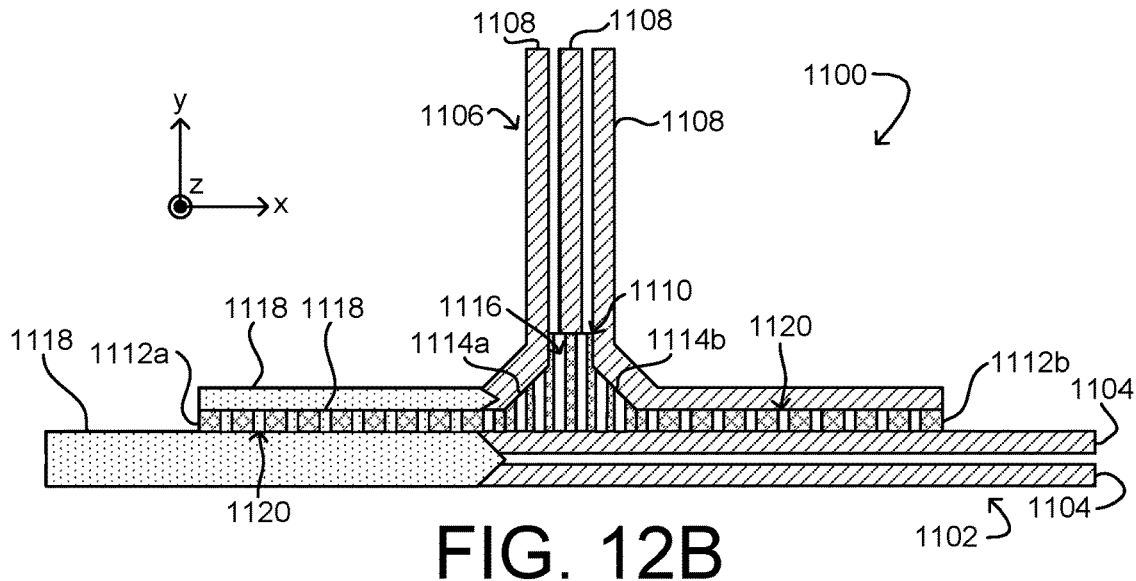
Figure 12C:
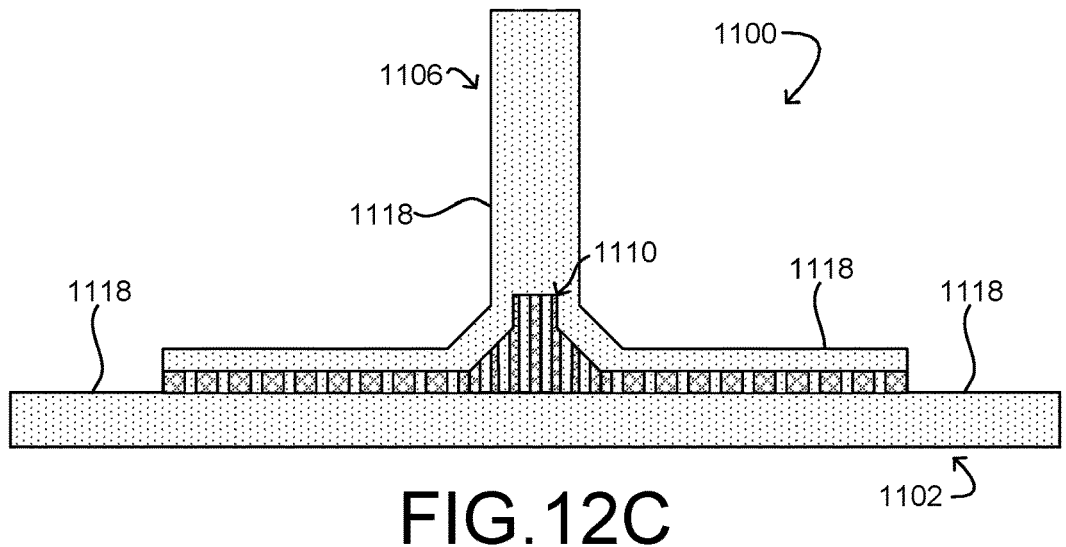

As indicated at 522 of FIG. 5B, the preform assembly is infused with a liquid resin. As indicated at 524, a vacuum can be drawn to infuse the resin through the preform. FIGS. 12A-12C show a schematic cross-section of the preform assembly 1100 of FIG. 11 at successive stages of resin infusion. First, FIG. 12A shows 1118 resin introduced at a side of the skin 1102. Next, FIG. 12B shows the resin 1118 infusing through the material layers 1104 of the skin 1102. The resin 1118 also infuses through pores 1120 in the additively manufactured sub-structure 1110. The pores 1120 enable the resin 1118 to move out of the plane of the skin 1102, such that the resin 1118 can reach portions of the preform 1100 that are on an opposite side of the additively manufactured sub-structure 1110 from where the resin 1118 is introduced. In the example of FIG. 12B, the resin 1118 infuses through the pores 1120 to infuse the stiffener 1106. In this manner, the pores 1120 help to prevent the formation of "shadow" voids behind the additively manufactured sub-structure 1110.

In the example of FIG. 12C, the resin 1118 is infused through the entire preform assembly 1100, including an entire pore space of the additively manufactured sub-structure 1110. It will be appreciated that, in other examples, the additively manufactured sub-structure 1110 may enable the resin 1118 to infuse the skin 1102 and the stiffener 1106 without infusing the entire pore space of the additively manufactured sub-structure 1110.

As indicated at 526 of FIG. 5B, the resin is cured to form a composite part. In the example of FIG. 12C, the cured resin 1118 forms a solid polymer matrix that integrates the skin 1102, the stiffener 1106, and the additively manufactured sub-structure 1110 into a unitary structure.

Any suitable curable liquid resin may be used in such an infusion process. Some examples of suitable resin materials include epoxies, bis-maleimides (BMI), benzoxazines, phenolics, polyimides, phthalonitrile, other thermoplastic or thermosetting resins or adhesives, and combinations thereof. In some examples, the resin is a thermosetting resin that is cured at or above a threshold temperature. For example, the resin can be cured at a temperature in the range of 100° C. to 180° C. In some examples, the resin comprises a low viscosity infusion resin having a viscosity that is suitably low to infuse the preform within a desirable processing time.

In some examples, curing the resin comprises crosslinking the cured resin to the preform. For example, the cured resin can be configured to form a covalent chemical bond with one or more of the additively manufactured sub-structure, the skin, and the stiffener. In other examples, the cured resin forms a mechanical linkage between each of the components of the preform. In yet other examples, the cured resin forms a combination of chemical bond, physiochemical bonds (e.g. hydrogen bonding) and/or mechanical linkages with each of the components of the preform.

In some examples, the skin, the stiffener, the additively manufactured sub-structure, and the polymer matrix have coefficients of thermal expansion (CTE) of from about −1 to about 200 ($10^{-6}$ m/m° C.). In other examples, the CTEs are preferably in a range of −1 to 20 ($10^{-6}$ m/m° C.). In yet other examples, the CTEs are preferably in a range of −1 to 10 ($10^{-6}$ m/m° C.). It will be appreciated that the CTE can vary based on direction and fiber orientation. By fabricating the skin, the stiffener, the additively manufactured sub-structure, and the polymer matrix from materials having suitably similar CTEs, the composite part may be more resistant to thermal cycling and thermal shock. The CTE can be measured by ASTM E831 (Standard Test Method for Linear Thermal Expansion of Solid Materials by Thermomechanical Analysis).

In some examples, one or more of the additively manufactured sub-structure, the skin, the stiffener, and the polymer matrix of the composite part have a toughness within a range of 0.1 J/mm$^2$ to 10 J/mm$^2$. In some more specific examples, such as for a lightweight interlayer of a carbon fiber/epoxy composite, the toughness can be within a range of 0.5 J/mm$^2$ to 2 J/mm$^2$. In other examples, such as for a higher performance carbon fiber/epoxy interlayer, the toughness can be preferably in a range of 2 J/mm$^2$ to 5 J/mm$^2$. In yet further examples, such as for an 3D printed interlayer, the toughness can be in a range of 3 J/mm$^2$ to 10 J/mm$^2$. It will also be appreciated that the toughness can vary based on the material and design. Toughness can be measured, for example, according to the process described in ASTM D5528 (Standard Test Method for Mode I Interlaminar Fracture Toughness of Unidirectional Fiber-Reinforced Polymer Matrix Composites).

In some examples, the additively manufactured sub-structure can have a glass transition temperature ($T_g$) of 30° C. to 250° C. In this manner, cracking can be mitigated during thermal cycling and structural loading. Glass transition temperature can be measured, for example, according to the process described in ASTM D5028 (Standard Test Method for Curing Properties of Pultrusion Resins by Thermal Analysis).

Figure 13:
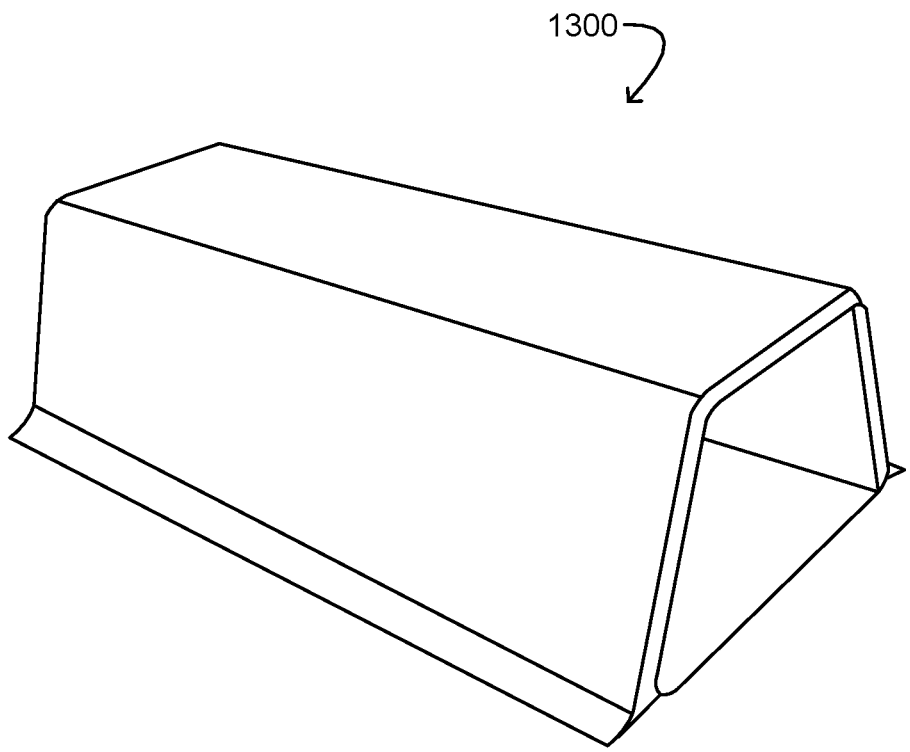
FIG. 13 shows another example of an additively manufactured sub-structure for use in a composite part for a vehicle.

FIG. 13 shows another example of an additively manufactured sub-structure 1300 for use in a composite part for a vehicle. Additively manufactured sub-structure 1300 comprises a shell for incorporation in a top hat stiffener. The shell can support layers of a dry fiber reinforcement (e.g. carbon fiber) for a liquid resin infusion process. In some examples, additively manufactured sub-structure 1300 is not porous. In such examples, additively manufactured sub-structure 1300 may comprise a surface texture and/or a material configured to co-bond to a resin matrix via mechanical and/or chemical and/or physiochemical bonding.

Further, the disclosure comprises configurations according to the following clauses:

Clause 1: A vehicle, comprising:
a composite part comprising
a skin comprising one or more material layers;
a stiffener comprising one or more material layers, the stiffener comprising a flange and a web;
an additively manufactured sub-structure positioned between at least a portion of the skin and at least a portion of the stiffener, the additively manufactured sub-structure comprising at least one flange portion, at least one radius, and at least one radius filler; and
a polymer matrix co-infused within the skin, the stiffener, and the additively manufactured sub-structure.

Clause 2: The vehicle of clause 1, wherein the stiffener comprises a longeron or a stringer.

Clause 3. The vehicle of clause 1, wherein one or more of the at least one flange portion and the at least one radius filler of the additively manufactured sub-structure comprises a pore space fraction of about 0.1% to about 99%.

Clause 4. The vehicle of clause 1, wherein one or more of the at least one flange portion and the at least one radius portion of the additively manufactured sub-structure comprise a material comprising a thermoplastic and optional additives, fillers, or a combination of additives and fillers.

Clause 5. The vehicle of clause 4, wherein the material comprises a thermoplastic selected from the group consisting of polyamides, polyimides, polyaryletherketones.

Clause 6. The vehicle of clause 4, wherein the at least one flange and the at least one radius filler comprise different materials.

Clause 7. The vehicle of clause 1, wherein the skin, the stiffener, the additively manufactured sub-structure, and the polymer matrix have coefficients of thermal expansion (CTE) that of from about −1 to about 120 ($\times 10^{-6}$ m/m° C.).

Clause 8. The vehicle of clause 1, wherein the composite part has a toughness of about 0.5 to about 10 J/mm$^2$.

Clause 9. The vehicle of clause 1, wherein the additively manufactured sub-structure comprises a material having a glass transition temperature within a range of 30° C. to 250° C.

Clause 10. The vehicle of clause 1, wherein the one or more material layers of the skin and the one or more material layers of the stiffener each comprise one or more of carbon fiber, fiberglass, polyimide fibers, aramid fibers, basalt, and polypropylene fibers.

Clause 11. The vehicle of clause 1, wherein the stiffener comprises a top hat stiffener, a blade stiffener, an omega stiffener, a prism stiffener, a flat stiffener, a bulb flat stiffener, or an angle stiffener.

Clause 12. The vehicle of clause 1, wherein the polymer matrix is formed from a low viscosity infusion resin.

Clause 13. The vehicle of clause 12, wherein the low viscosity infusion resin from which the polymer matrix is formed comprises one or more of a thermoset material and a thermoplastic material.

Clause 14. The vehicle of clause 12, wherein the low viscosity infusion resin from which the polymer matrix is formed comprises one or more of an epoxy resin, a bis-maleimide, a benzoxazine, a polyimide, a phthalonitrile or a phenolic resin.

Clause 15. The vehicle of clause 1, wherein the at least one flange portion of the additively manufactured sub-structure comprises a thickness in a range of 0.001 inches to 0.1 inches.

Clause 16. The vehicle of clause 1, wherein the at least one flange portion of the additively manufactured sub-structure comprises a length in a range of 0.05 inches to 5 inches.

Clause 17. The vehicle of clause 1, wherein the at least one radius comprises a length in a range of 0.01 to 5 inches.

Clause 18. The vehicle of clause 1, wherein the at least one radius filler has a height in a range of 0.01 to 2 inches.

Clause 19. The vehicle of clause 1, wherein the additively manufactured sub-structure further comprises at least one web portion, and wherein the at least one radius is located between the at least one flange portion and the at least one web portion.

Clause 20. The vehicle of clause 19, wherein the at least one web portion of the additively manufactured sub-structure comprises a height in a range of 0.01 to 15 inches.

Clause 21. The vehicle of clause 1, wherein the additively manufactured sub-structure comprises a connector that connects to a complementary connector on an adjacent additively manufactured sub-structure.

Clause 22. The vehicle of clause 1, wherein the polymer matrix is chemically bonded with one or more of the additively manufactured sub-structure, the skin, and the stiffener.

Clause 23. The vehicle of clause 1, wherein the polymer matrix is mechanically connected to one or more of the additively manufactured sub-structure, the skin, and the stiffener.

Clause 24. A composite part for a vehicle, the composite part comprising:
 a skin comprising one or more material layers;
 a stiffener comprising one or more material layers, the stiffener comprising a flange and a web;
 an additively manufactured sub-structure positioned between at least a portion of the skin and at least a portion of the stiffener, the additively manufactured sub-structure comprising at least one flange portion, at least one radius, and at least one radius filler; and
 a polymer matrix co-infused within the skin, the stiffener, and the additively manufactured sub-structure.

Clause 25. The composite part of clause 24, wherein the at least one flange portion of the additively manufactured sub-structure comprises a pore space fraction of about 0.1% to about 99% of a volume of the additively manufactured sub-structure.

Clause 26. The composite part of clause 24, wherein one or more of the at least one flange and the at least one radius of the additively manufactured sub-structure comprise a material comprising a thermoplastic and optional additives, fillers, or a combination of additives and fillers.

Clause 27. The composite part of clause 24, wherein the one or more material layers of the skin and the one or more material layers of the stiffener each comprises carbon fiber.

Clause 28. The composite part of clause 24, wherein the polymer matrix comprises one or more of an epoxy resin, a bis-maleimide, a benzoxazine, a polyimide, a phthalonitrile, a benzoxazine, a polyimide, a phthalonitrile, or a phenolic resin.

Clause 29. The composite part of clause 28, wherein the additively manufactured sub-structure comprises a connector configured to connect to a complementary connector on an adjacent additively manufactured sub-structure.

Clause 30. A method for forming a composite part for a vehicle, the method comprising:
 forming an additively manufactured sub-structure comprising at least one flange portion, at least one radius, and at least one radius filler;
 forming a preform comprising one or more material layers of a skin, the additively manufactured sub-structure, and one or more material layers of a stiffener, the stiffener comprising a flange and a web;
 infusing the preform with a liquid resin; and
 curing the liquid resin to form the composite part.

Clause 31. The method of clause 30, wherein infusing the preform with the resin comprises drawing a vacuum to infuse the resin through the preform.

Clause 32. The method of clause 30, wherein forming the additively manufactured sub-structure comprises forming one or more of the at least one flange portion and the at least one radius portion of the additively manufactured sub-structure from a material comprising a thermoplastic and optional additives, fillers, or a combination of additives and fillers.

Clause 33. The method of clause 30, wherein forming the additively manufactured sub-structure comprises forming the at least one flange portion with a pore space fraction of about 0.1% to about 99%.

Clause 34. The method of clause 30, wherein forming the additively manufactured sub-structure comprises forming the at least one flange portion of the additively manufactured sub-structure to comprise a thickness in a range of 0.001 inches to 0.1 inches.

Clause 35. The method of clause 30, wherein forming the additively manufactured sub-structure comprises forming the at least one flange portion of the additively manufactured sub-structure to comprise a length in a range of 0.05 inches to 5 inches.

Clause 36. The method of clause 30, wherein forming the additively manufactured sub-structure comprises forming the at least one radius to comprise a radial length to a center of curvature in a range of 0.01 to 5 inches.

Clause 37. The method of clause 30, wherein forming the additively manufactured sub-structure comprises forming the at least one radius filler to comprise a height in a range of 0.01 to 2 inches.

Clause 38. The method of clause 30, wherein forming the additively manufactured sub-structure further comprises forming at least one web portion, and forming the at least one radius between the at least one flange portion and the at least one web portion.

Clause 39. The method of clause 38, wherein forming the additively manufactured sub-structure comprises forming the at least one web portion of the additively manufactured sub-structure to comprise a height in a range of 0.01 to 15 inches.

Clause 40. The method of clause 30, wherein the additively manufactured sub-structure is a first additively manufactured sub-structure and comprises a connector, and wherein forming the composite part comprises connecting the connector of the first additively manufactured sub-structure to a complementary connector of a second additively manufactured sub-structure.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described can be performed in the sequence illustrated and/or described, in other sequences, in parallel, or omitted. Likewise, the order of the above-described processes can be changed.

The subject matter of the present disclosure includes all novel and non-obvious combinations and sub-combinations of the various processes, systems, and configurations, and other features, functions, acts, and/or properties disclosed herein, as well as any and all equivalents thereof.

The invention claimed is:

1. A vehicle, comprising:
a composite part comprising
a skin comprising one or more material layers;
a stiffener comprising one or more material layers, the stiffener comprising a flange and a web;
an additively manufactured sub-structure positioned between at least a portion of the skin and at least a portion of the stiffener, the additively manufactured sub-structure comprising at least one flange portion, at least one radius, and at least one radius filler, wherein one or more of the at least one flange portion and the at least one radius filler of the additively manufactured sub-structure comprises a pore space fraction of about 0.1% to about 99%; and
a polymer matrix co-infused within the skin, the stiffener, and the additively manufactured sub-structure.

2. The vehicle of claim 1, wherein the stiffener comprises a longeron or a stringer.

3. The vehicle of claim 1, wherein one or more of the at least one flange portion and the at least one radius portion of the additively manufactured sub-structure comprise a material comprising a thermoplastic.

4. The vehicle of claim 3, wherein the material comprises one or more of a polyamide, polyimide, or polyaryletherketone.

5. The vehicle of claim 3, wherein the at least one flange and the at least one radius filler comprise different materials.

6. The vehicle of claim 1, wherein the skin, the stiffener, the porous additively manufactured structure, and the polymer matrix have coefficients of thermal expansion (CTE) that of from about 1 to about 20 ($\times 10^{-6}$/° C.).

7. The vehicle of claim 1, wherein the composite part has a toughness of about 0.5 to about 10 J/mm$^2$.

8. The vehicle of claim 1, wherein the at least one radius comprises a length in a range of 0.01 to 5 inches.

9. The vehicle of claim 1, wherein the additively manufactured sub-structure comprises a connector that connects to a complementary connector on an adjacent additively manufactured sub-structure.

10. The vehicle of claim 1, wherein the polymer matrix is chemically bonded with one or more of the additively manufactured sub-structure, the skin, and the stiffener.

11. The vehicle of claim 1, wherein the polymer matrix is mechanically connected to one or more of the additively manufactured sub-structure, the skin, and the stiffener.

12. A composite part for a vehicle, the composite part comprising:
a skin comprising one or more material layers;
a stiffener comprising one or more material layers, the stiffener comprising a flange and a web;
an additively manufactured sub-structure positioned between at least a portion of the skin and at least a portion of the stiffener, the additively manufactured sub-structure comprising at least one flange portion, at least one radius, and at least one radius filler, wherein the at least one flange portion of the additively manufactured sub-structure comprises a pore space fraction of about 0.1% to about 99% of a volume of the additively manufactured sub-structure; and
a polymer matrix co-infused within the skin, the stiffener, and the additively manufactured sub-structure.

13. The composite part of claim 12, wherein one or more of the at least one flange and the at least one radius of the additively manufactured sub-structure comprise a material comprising a thermoplastic.

14. The composite part of claim 13, wherein the material comprises one or more of a polyamide, polyimide, or polyaryletherketone.

15. The composite part of claim 13, wherein the at least one flange and the at least one radius filler comprise different materials.

16. The composite part of claim 12, wherein the stiffener comprises a longeron or a stringer.

17. The composite part of claim 12, wherein the additively manufactured sub-structure comprises a connector that connects to a complementary connector on an adjacent additively manufactured sub-structure.

18. The composite part of claim 12, wherein the polymer matrix is chemically bonded with one or more of the additively manufactured sub-structure, the skin, and the stiffener.

19. The composite part of claim 12, wherein the at least one radius comprises a length in a range of 0.01 to 5 inches.

20. The composite part of claim 12, wherein the polymer matrix is mechanically connected to one or more of the additively manufactured sub-structure, the skin, and the stiffener.

* * * * *